FIG.1

Paul H. Foster
William J. Stark  Inventors

By John D. Gassett  Attorney

Paul H. Foster
William J. Stark   Inventors

By John D. Gossett   Attorney

FIG. 3

Oct. 23, 1962 P. H. FOSTER ETAL 3,060,404
SYSTEM FOR AUTOMATIC TRANSCRIBING WITH MANUAL OVERRIDE
Filed Dec. 28, 1959 4 Sheets-Sheet 4

FIG. 4

Paul H. Foster
William J. Stark   Inventors

By John D. Gassett   Attorney

United States Patent Office 3,060,404
Patented Oct. 23, 1962

3,060,404
SYSTEM FOR AUTOMATIC TRANSCRIBING WITH MANUAL OVERRIDE
Paul H. Foster, Sand Springs, and William J. Stark, Tulsa, Okla., assignors to Jersey Production Research Company, a corporation of Delaware
Filed Dec. 28, 1959, Ser. No. 862,354
6 Claims. (Cl. 340—15.5)

This invention relates to an apparatus and process for translating linear graphs into graphs or signals that possess a reproducible quality. It especially concerns a system for translating or transcribing oscillographic-type seismic traces into reproducible traces where the latter traces are preferably arranged to form a corrected seismic section.

Geophysical prospecting using artificially induced seismic disturbances has found wide application in the search for petroleum and other minerals. It is the general practice to initiate an explosion or other seismic disturbance at a point near the surface of the earth to direct seismic waves downward into the earth from that point. The waves continue to travel downward within the earth until they encounter discontinuities in the earth's structure in the form of various substrata formations and the like. These discontinuities have the effect of reflecting at least a portion of the sismic waves back toward the surface of the earth. By arranging a plurality of geophones or other seismic transducers at spaced distances from the seismic disturbance point, it is possible to detect the arrival of the reflected seismic waves at the surface of the earth. The detected waves are translated to electrical impulses which are then indicative of the character of the ground motion and are usually referred to collectively as a seismic signal which is in effect a composite signal made up of a plurality of electric signals varying in frequency and amplitude. The electrical signals oscillate by a record reference base line.

Generally speaking, the seismic signal generated by each detector or a group of detectors in a seismic observation is recorded in the form of a separate trace on a seismogram. In other words, each trace on a seismogram is a record with time of the variations in the output of the detector associated with the trace.

Until recently, most seismic information has been generally recorded using either the reflecting mirror galvanometer or oscillographic pen recorders. Thus the train of signals generated by each geophone or seismic transducer is translated to the galvanometer or pen recorder and a suitable record medium such as a photographic film or record paper moves relative to the recording device. A record in the form of an oscillographic or "wiggly" trace is thereby recorded on a record medium. The amplitude and frequency of the trace is directly related to the magnitude and frequency of the signal which is transmitted by the seismic transducer to the recording device.

The usual practice has been to examine the amplitude characteristics of the recordings made of the seismic signal by correlating the amplitudes of a plurality of traces on a seismic record. Seismic observers can, by observing such traces, determine the shape of reflected subsurface formations. By accurately recording the time required for the seismic waves to travel to the reflection surfaces and return to the geophones, it is possible to determine the depth of such reflection surfaces.

Most conventional seismographs—that is, devices for recording seismic signals—are capable of recording up to 24 or more separate seismic signals simultaneously. Thus, if a seismic observation results in 24 seismic signals being generated at as many detection stations, the resulting seismograph is a 24 trace record of the resulting 24 signals. These signals are usually arranged in a side-by-side relationship. A timing trace, indicating predetermined time intervals, is simultaneously recorded with the seismic signals to indicate the lapsed time from the shot to a point on each trace. Once a seismogram has been made, persons skilled in the art are generally able to determine from the seismograms certain characteristics of the earth's substrata in the vicinity of the seismic observation.

The accuracy of exploration by seismic methods depends to a large extent upon the ability of an observer to analyze records of seismic information. It has been found that variable density records, in which the signal is reproduced as a photographic trace, for example, in which the density along the trace is varied in proportion to the intensity of the signal, are more easily analyzed than other types of records. However, a considerable number of seismic sections have been prepared in the past in the oscillographic-type sections. A system for transcribing such oscillographic-type sections into variable density sections is described in the patent application Ser. No. 771,668, filed in the names of John Martin Horeth, Jesse Daniel Skelton, and William Joseph Stark. A system for transcribing such oscillographic-type sections described above into reproducible sections such as recordings on magnetic tape or the like is described in the patent application Ser. No. 821,740, filed June 22, 1959, in the name of Haines C. Hibbard. The system of converting oscillographic-type traces or seismic sections into variable density sections has proved quite helpful to seismic observers. Likewise, the system of converting oscillographic-type traces or seismic sections into reproducible sections such as on magnetic tape also greatly facilitate the processing of such sections for reproducing the sections as may be desired. However, in each of the systems mentioned above, the process of transcribing may be described as essentially a manual type transcribing system. That is, an operator must continually control the position of the stylus so that it follows the trace being transcribed.

It is thus believed clear that there is a need for a system that is capable of automatically transcribing a wiggly trace into a reproducible section or trace. A system which will automatically transcribe a seismic trace while incorporating seismic corrections is described herein. Such a system described herein works rather well on the transcribing of seismic oscillographic-type trace sections except in areas on a section where there is overlapping between the traces. In such a situation, the overlapping of the traces will appear as noise on the transcribed signal and will distort the transcribed signal. If the overlap is sufficiently great the distortion will be such as to make an unusable reproduced signal. The distorted signal can be eliminated by manually following the trace through the area of overlapping traces. It is thus clear that there is a need for a system which can automatically transcribe the part of a wiggly trace type section in which the traces do not overlap and means for manually transcribing the overlapping portions of the traces. The manual transcribing means must be compatible with the automatic transcribing means. Such an automatic transcribing system with compatible manual override is disclosed in this application.

A better understanding of this invention and its objects may be had by referring to the following description and claims taken in conjunction with the accompanying drawings in which:

FIG. 2 illustrates a preferred apparatus embodiment of the invention in perspective, schematic form capable of transcribing automatically with a manual override a wiggly trace record into a variable density section and into a record on a magnetic recording medium or the like;

Figure 1:
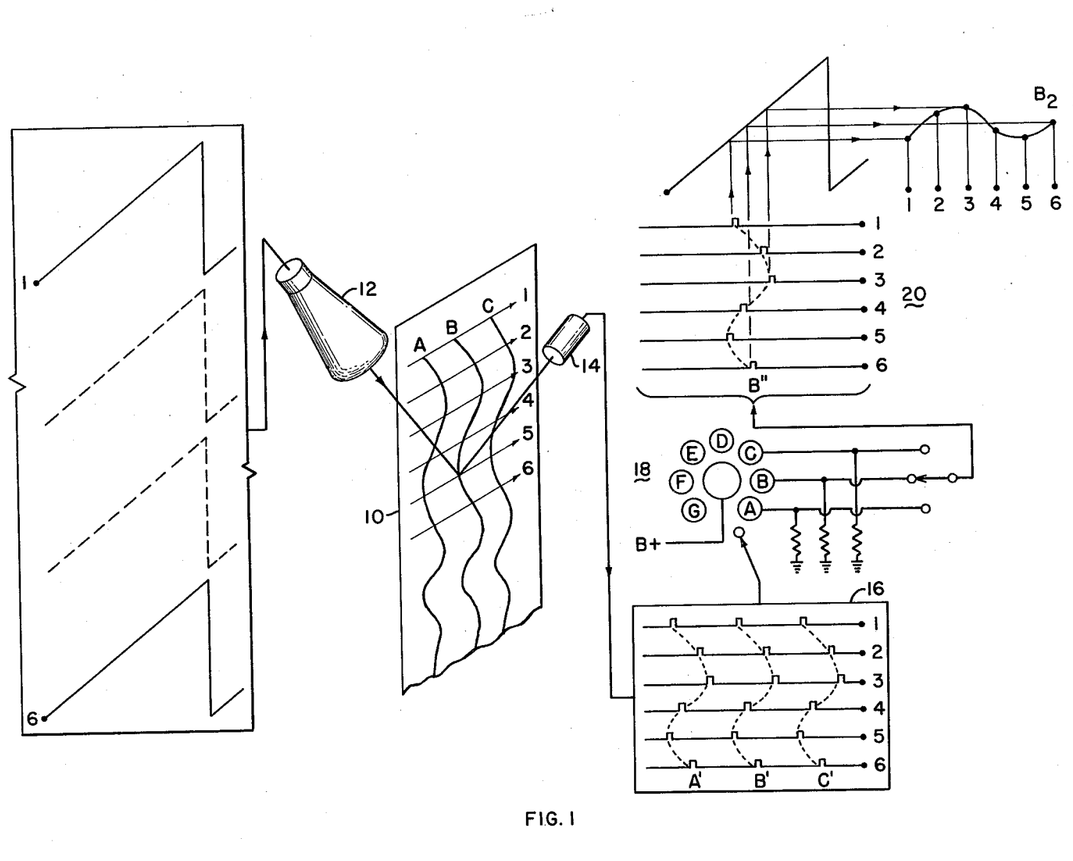
FIG. 1 illustrates in schematic form principles of an automatic transcribing system.

A system for automatically transcribing one wiggly trace out of a plurality of such traces is illustrated especially in FIG. 1. For the purpose of this illustration a segment of a wiggly trace record 10 has been shown which has three traces, A, B, C thereon. A plurality of sawtooth signals are used to move a spot of light across a face of a cathode ray tube 12. For convenience there are 6 sawtooth sweeps, 1 through 6, indicated as being fed to cathode ray tube 12. The spot of light which is moved across the face of cathode ray tube 12 is focused on a conventional trace record 10 and moves transversely across such record. As the spot of light moves across the record, phototube 14 produces an electric pulse as the spot crosses the seismic trace. The output pulses or signals from photocell 14 is illustrated in block 16.

There are illustrated 6 sawtooth sweeps and the spot on cathode ray tube 12 sweeps across the wiggly trace record 6 times, one time for each sawtooth sweep illustrated. As the record is moved with respect to the cathode ray tube and phototube the spot will sweep across the record at different positions as indicated by arrows 1, 2, 3, 4, 5 and 6 on the record. Sawtooth number 1 makes sweep number 1 cross the record and the phototube output signal number 1 as shown in block 16 has pulses A', B', C' corresponding to the intersection of traces A, B, and C with sweep number 1. Successive sweeps repeat this process and pulses A', B', and C' of the output signal outline the approximate form of wiggly traces A, B, and C.

At this point, it is desired to separate pulses A', B', and C' shown in block 16, which contains the wiggly trace intelligence, and reconstruct wiggly trace B, for example. This is accomplished as illustrated by connecting the phototube output signal to counter 18 which separates pulses A', B', and C' for each sweep. The counter output 18 illustrated at 20 and pulses B'' is essentially pulses B' separated from pulses A' and C'. The counter can be set to separate in any suitable desired sequence. There are illustrated seven separating cathodes A through G shown as circles. The pulses from the counter output are compared to a sawtooth signal 21 from a sample and hold circuit (not shown in FIG. 1) which samples the value of the sawtooth waveform at that instant, and holds it until a second pulse generated by sweep number 2 resets the sample hold circuit. The time at which the sawtooth waveform is sampled is proportional to the amplitude of the signal being transcribed. The wiggly trace $B_2$ then approximates the wiggly trace signal B which is being transcribed. $B_2$ is shown schematically; each pulse from counter 18 is not shown sampling the sawtooth signal as to do so would unnecessarily complicate the drawing.

It is seen, then, that this is a system for successively sweeping the surface of a graph (of a trace or traces) with a point of light across a series of positions displaced progressively along such graph. Means are provided to determine the time of passage of each sweep as it crosses the particular trace being reproduced. The pulse that is generated is the function of the time of a crossing of a particular trace or signal which is therefore a function of or is proportional to the amplitude of the trace being transcribed. Means are then provided to reconstruct from the intelligence of the pulses, a signal which is essentially the same as that being transcribed.

Figure 2:
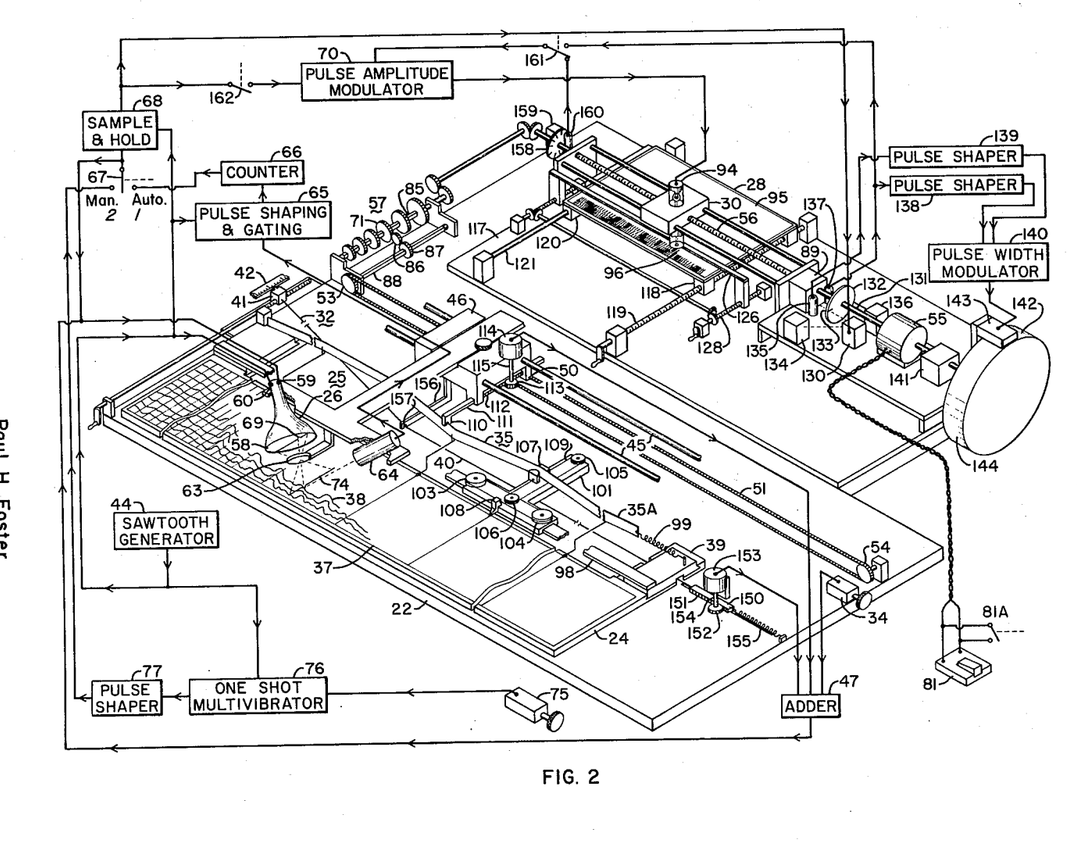

Referring next to FIG. 2 which illustrates a preferred embodiment of the invention and the best mode contemplated for carrying out the invention, it will be seen that there the apparatus includes means for translating or transcribing a wiggly trace section to (1) a variable density or variable color seismic section reflecting changes in the seismic signal being transcribed, and (2) a record of the signal on a magnetic recording medium. It will also be seen that the apparatus is capable of incorporating corrections into the transcribed seismic section including (1) static corrections to compensate for various elevations to the geophones, (2) spread correction factor to compensate for the distances the geophones are located from the shot point, and (3) paper speed variations to correct the error in the relative lengths of portions of the paper or papers in which the oscillographic trace was recorded.

Referring to FIG. 2, it will be seen that the invention, in an apparatus form, includes a base member 22, an original record holder or mounting 24, cathode ray tube 26, section holder 28, recording mechanism 30, spread correction mechanism 32, static correction potentiometer 34, and paper speed variation mechanism 35.

Record holder 24 is adapted to hold a conventional seismic record 37 on which are recorded oscillographic-type traces produced by a reflecting mirror galvanometer, for example. It will be recognized that longitudinal distances and measurements along the length of the seismic record (in the record holder 24) correspond to time measurements on the record itself. Furthermore, the lateral distances or displacements on the seismic record correspond to variations in the amplitude of the seismic signals that are recorded on the record. In the figure, a trace 38 which is typical and representative of the traces that are obtained on conventional seismic records, has been depicted upon record 37 among a plurality of traces.

Further, relative to record 37, it will be noted that this record is placed on record holder 24 in a manner such that the shallow end of the record i.e., the portion of the record corresponding to the reflections from the shallow portions of the earth be disposed toward the left end of the record holder in the figure. By locating the shallow end of the record in this manner, the record is properly coordinated with the spread correction mechanism 32 which will become more apparent later in this description.

An arm 39 is secured to one end of record holder 24 as shown in the figure. It is preferred that this arm be connected to the end of the record holder which corresponds to the deep end of the record 37 in order to render the apparatus more compact in its construction.

The principles of spread correction, static correction and paper speed correction have been fully and completely described in the aforesaid copending application Ser. No. 771,668. New means of applying these corrections are shown herein.

Attention is now directed briefly toward the mechanism for introducing (1) paper speed correction, (2) static correction, and (3) spread correction. The paper speed correction device includes a linear cam or tape 35-A extending the length of the seismic record 37. It is mounted rigidly at one end to bar 98 and at the other end to spring 99. Spring 99 is secured to arm 39. The mechanism of the drawing operable with the scanning mechanism can compensate for any time lines spaced in variation along record 37 and includes a plurality of pulley assemblies 101 mounted on and spaced along calibrated reference bar 98 which is mounted slidably on record holder 24. Assembly 101 includes two pulleys 103 and 104, lateral pulley 105, translating pulley 106, clamp 107, index member 108, and wire 109. Movements of index member 108 along seismogram 37 cause clamp 107 to move equal distances in a traverse direction. Record holder 24 has a reference mark for aligning the "break-time" of successive seismograms. Since the break-time of any given seismogram may not coincide exactly with the "time-line" it is desirable that bar 98 be adjustable slidably along record holder 24. Then, the zero time mark on the bar can be aligned with the convenient time-line, preferably aligned adjacent the "break-time." This line, although not the actual zero time for the seismogram, is commonly called the "zero time-line."

Rack 112 on arm 111 engages pinion 113. Arm 111 is slidably mounted from carriage 46. Cam follower 110 at the end of rack 112 is adapted to ride along the linear cam or tape 35-A. Tape 35-A is provided to compensate for time errors occasioned by variations in the speed of the recording process used to obtain the original record. Pinion 113 drives potentiometer means 114 through shaft 115. The output from potentiometer means 114 is connected to adder 47. The output of adder 47 is connected to vertical deflection plate 59 of cathode ray tube 26 to position the spot of light thereon in a manner to compensate for variations in record speed on original record 37. In other words, the scanning will be either advanced or retarded to compensate for paper speed variations.

If no time distortion exists in the seismogram 37, the base line of cam 35-A is parallel to the time axis of the traces on the seismogram. Otherwise, it has departures along its length so that the cam follower 110 and arm 111 move laterally in and out thereby varying the output of potentiometer means 114. Upon consideration, then, it will be apparent that the scanning spot means of cathode ray tube 26 is made to advance relatively faster or slower than the recording means 30 along recording medium 95, or recording head 143 along magnetic recording medium 144, depending upon the existence of any timing errors in seismogram 37. In other words, the cam 35-A together with its cam follower, potentiometer means 114 and associated parts enable the scanning spot means and recording means to travel along the length of the respective records in substantially time synchronism.

Secured to slidable bar 150 having rack 151 is elongated flexible member 40 which extends from the bar 150 to a laterally adjustable anchoring member 41. Bar 150 is slidably mounted on base member 22. Anchor member 41 may be conveniently mounted to base member 22; but it must be free to move laterally with respect to the longitudinal axis of record holder 24, that is, the longitudinal effective center line of each trace 38. Suitable mounting means for this purpose have not been illustrated in order to avoid complicating the figure unduly.

A suitable scale 42 is provided adjacent anchoring member 41 so that the degree of lateral displacement of member 41 relative to the longitudinal axis of record holder 24 and trace 38 may be readily determined. Scale member 42 is also arranged traversely with respect to the longitudinal axis of record holder 24 and is provided with a scale such that distances along the scale are proportional and related to the distances between the shot point location and the seismic transducer location produced in the trace on the record 37. This scale may be calibrated in terms of feet or time but it must be consistent with the time scale which is employed on the record itself.

Spring 155 is connected to bar 150 to maintain tension on elongated member 40. Arm 156 is mounted from carriage 46. At the end of arm 156 is cam follower 157. As the record is scanned the movement of cam follower 157 moves along elongated member 40 which causes bar 150 to move. Movement of bar 150 causes rack 151 to drive pinion 152 which engages rack 151.

Thus, scale 42, anchor member 41, elongated member 40, potentiometer means 153 and associated parts cooperate with one another to automatically correct each trace 38 on the record 37 for spread errors as these traces are translated to a corrected section holder 28.

Potentiometer means 34 is similar to potentiometers 114 and 153 except that potentiometer 34 is adjusted by hand to give an output voltage representative of the static correction which is desired to be applied to the trace being transcribed. The outputs of potentiometer means 34 representing the static correction, the output of potentiometer means 114 representing the paper speed correction and the output of potentiometer means 153 representing the dynamic or spread correction are all added together by adder 47. The output of adder 47, then, represents the three basic seismic corrections. This output from adder 47, then, is fed to the vertical deflecting plate terminal 59 of cathode ray tube 26; thus advancing or retarding the position of the spot of light on the face of cathode ray tube 26. It will be recognized, of course, that the potentiometer means 34, 114 and 153 and their associated parts will be designed such as to give output voltages representative of the corrections which are to be incorporated in the transcribing system.

Attention is now directed especially to the scanning mechanism and electrical circuits which includes cathode ray tube 26, photocell 64, sawtooth generator 44, longitudinal rods 45, and carriage member 46 slidably supported from rods 45. Supported from carriage member 46 is driving member 50 which is secured to and propelled by endless belt 51. In other words, member 50 travels along endless belt 51 and engages and drives carriage member 46 each time that it moves from pulley 53 to pulley 54. These pulleys and endless belt 51 are actuated and driven by suitable means such as variable speed motor 55, lead screw 56, and speed changer means 57.

The output from sawtooth generator 44 is electrically connected to the horizontal plate of cathode ray tube 26. The cathode ray tube is arranged with respect to section seismic record 37 so that the spot of light that sweeps across the face of cathode ray tube 26 by sawtooth generator 44 scans the record 37 in a traverse direction, i.e., perpendicular to the general direction of traces 38. Cathode ray tube 26 has a projecting fluorescent screen 58 and has vertical deflection plates with external terminal 59 and horizontal deflection plates having external terminal 60. A suitable cathode ray tube is a Tektronix TSI P-11 Blue manufactured and sold by Tektronix Inc., P.O. Box 35104, Dallas, Texas. A lens 63 is placed between the face of cathode ray tube 26 and record 37 so as to focus the spot of light on the record. Photoelectric cell 64 is spaced from record 37 and cathode ray tube 26 so as to receive reflections of the spot of light which scans the record. When the spot of light from cathode ray tube 26 scans transversely across record 37 it will pass the various traces thereon. When the spot of light crosses a trace such as trace 38 the amount of reflection of the spot of light will vary and be detected by photocell 64. At this point, the output of photocell 64 is fed to pulse shaping and gating circuit 65. A suitable pulse shaping and gating circuit is described on page 16, Z-90030 (pulse shaping) and page 40, Y-102 (gating circuit) Catalog No. 856-A issued by Engineered Electronic Company, 506 East First Street, Santa Ana, California. Also connected to pulse shaping and gating circuit 65 is the output from sawtooth generator 44. The sawtooth waveform from generator 44 is used to open the gate of pulse shaping and gating circuit 65. That is, when the sawtooth reaches a certain value the circuit permits any pulse from photocell 64 to pass therethrough to counter 66. The use of the sawtooth signal to actuate the gate prevents extraneous noise which may occur at the beginning of each sweep from photocell 64 from passing through counter 66.

In scanning the record transversely the photocell will transmit a pulse each time the beam of light of photocell 26 crosses a trace. If the trace 38, for example, is the trace being transcribed, it is necessary to separate the pulses which contains wiggly trace intelligence for trace 38 from the pulses of other traces on the record from phototube 64. As explained earlier in connection with FIG. 1 the output pulses from phototube 64 is fed into a counter 66. Counter 66 passes only those pulses which correspond to trace 38 or whatever trace is being scanned or transcribed. A suitable counter is commercially available from Sylvania Electric Products, Inc., 1891 East Third Street, Williamsport, Pennsylvania, and is designated 6910. It is, of course, understood that the selector switch of counter 66 may be set so as to select pulses from any trace desired.

A two-way switch 67 is provided such that when it is in a first position, it connects the output of counter 66 to a sample and hold circuit 68 and to vertical plate terminal 60 of cathode ray tube 26. This pulse from counter 66 puts a "pip" 69 on the face of cathode ray tube 26 and that pip "shines" on the record 37 and follows the trace being transcribed.

The output of counter 66 is also fed through switch 67 to sample and hold circuit 68. The sample and hold circuit has also fed to it the output sawtooth generator 44. When sample and hold circuit 68 receives a pulse from counter 66 it samples the instantaneous amplitude value of the sawtooth waveform and holds that value until the next pulses are received from counter 66. Stated differently, the output from sample and hold circuit 68 is a rectangular waveform with each level being determined by the instantaneous value of the sawtooth waveform at the time a pulse is received from counter 66. This "level" continues until the next succeeding pulse is received at which time the output of sample and hold circuit 68 is adjusted to correspond to the then instantaneous value of the sawtooth waveform. The output of sample and hold circuit is then seen to approximate the wiggly trace being transcribed. This output then may be fed to pulse amplitude modulating circuit 70 to operate glow tube 94 of printing means 30 which will be explained more in detail hereinafter.

Figure 3:
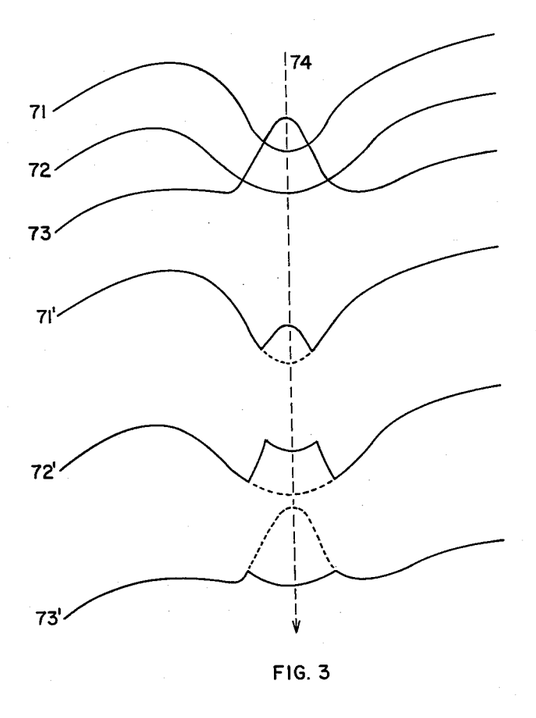
FIG. 3 illustrates a wiggly trace type seismic section in which the traces overlap.
Figure 4:
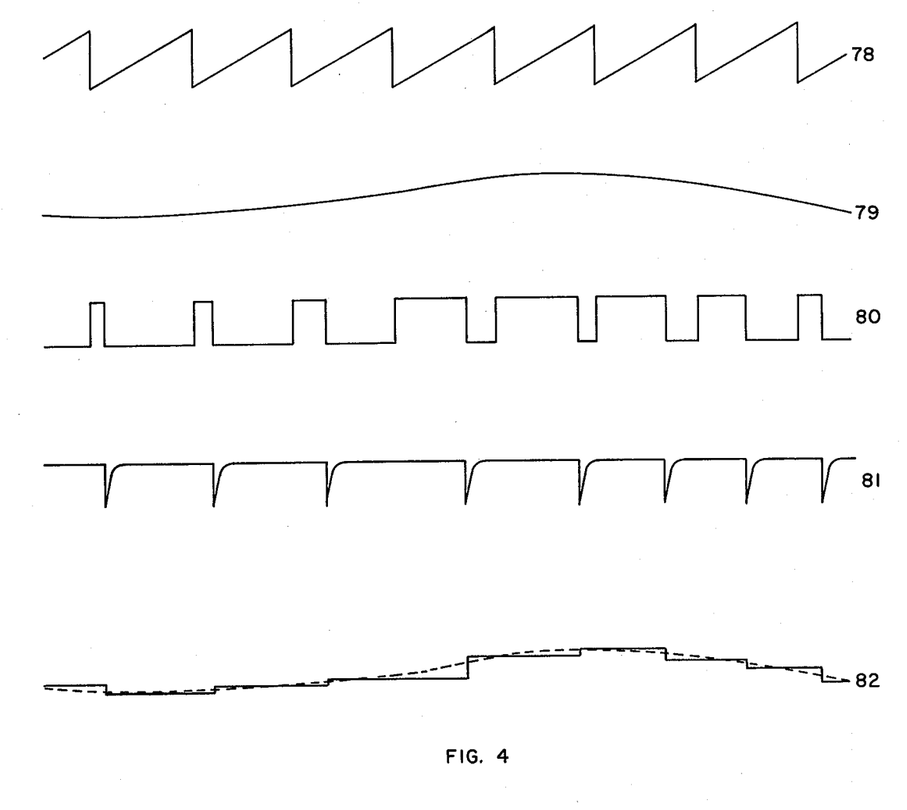
FIG. 4 represents a series of curves which occur when the manual override is in operation.

The system thus far described is utilized for automatic transcription. Attention will now be directed toward modification of this system for use in manual transcribing which is compatible with the system previously described. Reference will now be made to FIG. 3 which illustrates a tangled section of a wiggly trace at which point the automatic transcribing system produces a greatly distorted signal. For example, curves 71, 72 and 73 become greatly entangled and the automatic transcribing of such a system produces a distorted signal. For example, see sweep 74 which intersects trace 73 first, 71 second, 72 last. The counter 66, of course, passes the wrong pulse and the curves which would be transcribed then are illustrated as 71', 72', and 73': the dotted line illustrates the manner in which the curves should have been transcribed. The distortion, then, is seen to be considerable. When such a situation occurs, it is desirable to manually transcribe that portion of the seismic section or record. Attention will now be directed toward a system for manually transcribing that portion of the trace which is tangled, yet with such manual overriding system being compatible with the automatic transcribed portion. To put the operation of the system on manual, switch 67 is put in position number 2. Switch 81–A, shown in FIG. 2, is ganged to switch 67 such that when switch 67 is in position 1 switch 81–A is closed and when switch 67 is in position 2, switch 81–A is open as shown in FIGS. 2 and 3. When switch 67 is in position number 2 it connects potentiometer 75, a one shot multi-vibrator 76 and pulse shaper 77 into the operating circuit. The operations of these components will be more readily understood by reference to FIG. 4. Shown thereon is a sawtooth signal 78, potentiometer signal 79, output signal 80 of one shot multi-vibrator 76. At each peak of sawtooth 78, the multi-vibrator 76 starts a pulse as shown in FIG. 4 in curve 80. The duration of that pulse is dependent upon the instantaneous value of curve 79. The waveform represented by curve 80 is fed to pulse shaper 77. The trailing edge of each pulse shown in curve 80 determines the time when pulse shaper 77 emits a pulse as indicated in curve 81. As the two-position switch 67 is in position number 2, pulse shaper 77 is connected to sample and hold circuit 68. At each spike of signal 81 sample and hold circuit 68 samples the instantaneous value of sawtooth waveform 78 and holds that value until the next pulse is received. This results in the stairstep waveform as represented by the solid line at 82.

When in the manual operating position which is when switch 67 is in position number 2, the output of pulse shaper 77 is connected to the vertical plates of cathode ray tube 26. The signals or spikes in curve 81 then determine the position of "pip" 69. As will be seen, the scanning mechanism moves longitudinally along record 37. The positon of "pip" 69 is adjusted to follow the trace being recorded. This is done by manual operation of the adjusting means on potentiometer 75. The basic reference or synchronizing signal of this means is seen to be sawtooth signal from sawtooth generator 44 which is the same reference signal used in automatic transcribing when switch 67 is in position number 1.

At the same time that switch 67 is thrown into its second position, switch 81–A is opened, thus stopping variable speed motor 55. The speed of motor 55 is now controlled manually such as by foot pedal 81. Lead screw 56 from motor 55, in addition to other driving components, drives bevel gear 83 which is at right angles to gear 84 which in turn drives the speed changer means 57. As explained in the aforesaid copending application Ser. No. 771,668, speed changer 37 is provided to have a given linear length along each section to correspond to the single amount of recording time and seconds. Changer 57 employs a plurality of driving gears mounted on drive shaft 85, a movable idler gear 86, a movable driven gear 87, and driven gear 87 and shaft 88 are made to turn at different speeds. As a result, the speed of belt 51 is variable and may be made to correspond to the speed of the printing mechanism 30. It will be recognized, of course, that a continuously variable speed transmission may be readily used in place of the transmission shown.

Attention will now be directed especially toward the printing mechanism used for printing a variable density section. Longitudinal movement of printing mechanism 30 and scanning means 25 is effected by movement of lead screw 56 in response to reversible and variable speed motor 55 through gear box 89. The change in speed of motor 55 can be accomplished by varying the resistance in foot pedal 81, for example. During manual operation, the operator of the apparatus can readily control the rate of travel of cathode ray tube with the printing head 30 along their respective records. In the apparatus illustrated, there is shown a satisfactory means for permitting the rate of scanning to vary without impairing the quality of the record. A slotted disc 132 having a slot 133 is mounted upon a shaft from motor 55. On one side of slotted disc 132 is photocell 137 and on the other side is light source 136. The pulse from photocell 137 is fed to the pulse amplitude modulator circuit 70. Pulse amplitude modulator circuit 70 is provided to control the light source 94. Each pulse from photocell 137 causes glow tube 94 to glow; the intensity of the glow is determined by the signal from sample and hold circuit 68 which is also fed to pulse amplitude modulator 70. For this purpose, a light source is preferably a facsimile tube or glow modulating tube having a linear intensity response with variation of the amplitude of the signal applied to it.

The transcription speed may, by way of example, vary from 2 to 60 seconds per second of record. It is to be noted that a usual seismic record is approximately 6 seconds long, that is, it represents the movement of the earth detected by geophone over a period of 6 seconds. The extremes between 2 and 60 seconds occur between automatic and manual speed. The machine is stopped during the transition period between automatic and manual. However, the pulses from photocell 137 stop when the motor stops and therefore shuts off the glow tube. The amplitude modulated pulses to the glow tube are $\frac{1}{1000}$ second long in time. This is fast enough to essentially stop motion. The length of the light focused on the film from the glow tube is about 20 milliinches long.

At the fastest transcription speed, that is, at 2 seconds per second of record, the film will move relative to the glow tube only 1.4 milliinches during 1/1000 second pulse. Therefore the light from the glow tube covers only 7% more area during automatic transcription than during manual transcription. The maximum change due to variation in speed, then, does not effect the quality of the variable density section.

The entire "printing" portion of the apparatus may be mounted directly upon base plate 22. In the figure, it is shown to be located on a platform 117. Film holder 28 is supported on nuts 118 which engage the trace position in lead screw 119, and on bearing blocks 120 which slidably engage rod 121. A slit with adjusting bar 126 extending the length of the film is traversely adjustable upon movement of lead screw 128. Thus, the width of the beam of light projected from the printing head can be readily adjusted. It will be appreciated that the entire printing portion of the apparatus shown are preferably positioned within a light tight enclosure.

Reference is now made to that part of the embodiment shown in FIG. 2 which is used for recording the transcribed signal on a magnetic recording medium. As it will be seen, the output from sample and hold circuit 68 is fed to galvanometer 130. Also driven by motor 55 is shaft 131 which has supported thereon slotted disc 132. Slotted disc 132 has slot 133 therein. Light source 134 is arranged to direct light on the mirror of mirror galvanometer 130. The rotation of mirror galvanometer 130 is governed by the output of sample and hold circuit 68. Arranged on the opposite side of slotted disc 132 and from mirror galvanometer 130 is photoelectric cell 135. The mirror of galvonometer 130 is arranged to rotate so as to reflect light through slot 133 at different rotational positions of slot 133 as the mirror rotates in response to the signal received from sample and hold circuit 68. A second light source 136 is on the same side as disc 132 as is galvanometer 130. On the opposite side of disc 132 from light source 136 is photoelectric cell 137. When slot 133 is aligned between light source 136 and photoelectric cell 137 it causes photoelectric cell 137 to emit a pulse which is fed to pulse shaper circuit 138. The pulse occurs regularly as slot 133 becomes aligned between light source 136 and photoelectric cell 137. The position of slot 133 at which time photoelectric cell 135 is energized by light passing through slot 133 from mirror galvanometer 130 will vary as the rotational position of the mirror on galvanometer 130. The position of the mirror galvanometer 130 is a function of the amplitude of the signal being transcribed. Therefore, the time between the pulse going to pulse shaper 138 and the pulse going to pulse shaper 139 is a function of and is proportional to the amplitude of the signal being automatically transcribed. The pulse from pulse shaper 138 is fed to pulse width modulator 140 and determines the leading edge of a square or rectangular pulse of pulse width modulator 140 as an output signal. The position of the trailing edge of the output pulse is determined by the pulse from pulse shaper 139.

Also mounted on shaft 131 which is driven by motor 55 is gear box 141 and magnetic recording drum 142 which is provided with magnetic head 143. The output of pulse width modulator 140 is fed to magnetic head 143 which records it on magnetic tape 144 which has been placed upon magnetic tape drum 142. The speed of rotation of magnetic tape drum 142 is directly proportional to the rotational speed of slotted disc 132. It is seen, then, that the speed of rotation of motor 55 may be varied without varying the quality of the record recorded on magnetic tape 144. This is especially true inasmuch as the magnetic tape is essentially completely saturated during each pulse, so there is no problem of over or under saturation. Pulses recorded on the record are spaced in direct relation to position of corrected data from original record.

In the operation of this device shown in FIG. 2, a wiggly trace record 37 which is desired to be transcribed to a variable density section is placed on record holder 24. It is believed that the automatic manual operation of this apparatus shown in FIG. 2 is reasonably apparent from the drawing taken in conjunction with the principles and apparatus explained first in this description. However, to further clarify the operation it may be assumed that a film is used as the recording medium 95 at a conventional oscillographic-type seismogram 37 is mounted upon record holder 24. Then, assuming a given static correction for trace 38, potentiometer means 34 is adjusted so as to incorporate the desired static correction. This adjustment is achieved by turning the hand crank attached to potentiometer means 34.

Similarly, a spread correction is incorporated in the reproduced trace by adjusting the lateral position of anchor member 41 along its lead screw. This causes longitudinal movement of rack 151 against the spring 155. When the scanning means 25 moves from the shallow end of each trace to the deep end of each trace, arm 156 causes progressively less tension to be generated in elongated member 40. This decrease in tension in turn causes rack 151 to move thus rotating pinion 152 which causes the output of potentiometer means 153 to vary in a manner which automatically corrects the transposed information of each depth of the spread between a shot point and the geophone which generates the trace in question. It will be recognized that the length of member 40 must bear a relationship to the displacement of anchor member 41 along scale 42 which is proportional to the relationship between the actual depth equivalent to the length of trace 38 and the actual geophone spread of the field. It will further be recognized that the spread corrections should be made with the shot point and the various geophone locations first corrected to a common datum elevation.

The positions of index member 108 are aligned up with their corresponding time lines on a seismogram 37 and clamps 107 of the pulley assembly 101 are then fixed. Proper gear ratio is also selected for the speed changer 57 so as to coordinate or synchronize movement of the scanning means 25 and the printing mechanism 30. The width of the light beam (i.e. the dimension of the beam traverse to the length of the trace to be recorded) is adjusted as necessary by movement of lead screw 128 to correspond to the physical width to be represented by the trace in a section reproduced.

Having made the adjustments above and having positioned the scanning means 25, the printing mechanism 30 and recording head 143 in corresponding positions along seismogram 37, recording film 95 and magnetic recording medium 142, that is, at the respective zero time lines, operations of the apparatus may be started. Thus for automatic transcribing switch 67 is placed in position number 1. As switch 67 is ganged to switching means 31–A, the operation of the apparatus is commenced. Thus motor 55 and lead screw 36 are caused to turn. This movement causes the scanning means, the printing mechanism and the recording head to move along their respective traces. Simultaneously the output from sawtooth generator 44 causes a spot to sweep across cathode ray tube 26. For each trace that the spot crosses, it will cause a pulse to be emitted by photocell 64. Counter 66 has been positioned so as to pass only the pulses therethrough which correspond to the trace being reproduced which in this case is considered to be trace 38. The pulse representing trace 38, then, is fed to sample and hold circuit which samples the sawtooth waveform at that instance and holds it until the next pulse is received. The output from sample and hold circuit 68 is then fed to pulse amplitude modulator circuit 70 which is used in the manner described above to energize glow tube 94.

As described above in more detail, the output from sample and hold circuit 68 is also fed to galvanometer 130. The output from photocells 135 and 137 are fed through pulse shapers 138 and 139 which are in turn their outputs fed to pulse width modulator 140. The output of pulse width modulator 140 is then recorded on magnetic recording medium 142 in a manner fully described above.

The operation of the paper speed correction mechanism 35, static corrector 34, and spread correction 32 operates substantially as described above and their description will not be repeated herein at this point.

When the scanning means comes to a portion of the record which is greatly tangled, the operator throws switch 67 into position number 2. This stops motor 55 and cuts photocell 64 out of the circuit. Motor 55 is now operated by hand or rather by conveniently operated foot pedal switch 81–A, which is of a character to vary the speed of motor 55 depending upon the depression of the foot switch. The "pip" from cathode tube 26 which follows the trace is then controlled by hand control potentiometer 75 through a one-shot multi-vibrator 76 and pulse shaper 77. As the cathode ray tube 26 moves longitudinally along trace 38 the pip position is controlled by hand control potentiometer 75. The pulse shaper 77 is in turn controlled by one-shot multi-vibrator 76 and potentiometer 75 and sample and hold circuit samples the sawtooth waveform which is still the basic reference signal. The output from sample and hold circuit 68 is then fed to pulse amplitude modulator 70 and to mirror galvanometer 130 in the manner previously described. The system for recording on film 95 and on magnetic record 142 has been hereinbefore described. After the tangled portion of the seismograph has been passed, the machine is switched back to automatic by moving switch 67 to position 1. Automatic scanning is then automatically resumed.

Also driven by lead screw 56 is slotted time line generator disc 158 which is interposed between light source 159 and photocell 160. When it is desired to generate time lines, signals generated by photocell 160 may be passed through switch 161 to pulse amplitude modulator 70 and then applied to glow tube 94 to record time lines along film 95.

While there are above disclosed but a limited number of embodiments of this structure, process and product of invention herein presented, it is possible to produce still other embodiments without departing from the inventive concept herein disclosed. It is desired, therefore, that only such limitations be imposed on the appending claims as are stated therein.

What is claimed is:

1. In an automatic transcribing system for transcribing one of several oscillographic traces to an electrical signal using a sawtooth waveform to drive a spot across a cathode ray tube transversely to the longitudinal direction of the traces, a photoelectric cell to emit a pulse when said spot of light crosses a trace; a counter electrically connected to the output of photoelectric cell and of a character to pass therethrough only those pulses representative of the trace being scanned, and a sample and hold circuit whose output is a series of rectangular voltage levels formed by said sample and hold circuit sampling the sawtooth waveform at the instant it receives a pulse from said counter; the improvement which comprises: a manually adjustable potentiometer, a one-shot multi-vibrator means electrically connected to the output of said potentiometer, said multi-vibrator being of a character to emit a square pulse at each peak of the sawtooth waveform and the width of such square pulse being determined by the amplitude of the signal from said potentionmeter; a pulse shaper electrically connected to the output of said multi-vibrator and of a character to emit a sharp pulse for each trailing edge of said square wave pulse; switching means for disconnecting said counter and connecting said pulse shaper to said sample and hold circuit; and means electrically connecting the output of said pulse shaper with said cathode ray tube.

2. In an automatic transcribing system for transcribing one of several oscillographic traces to an electrical signal using a sawtooth waveform to drive a spot across a cathode ray tube traversely to the longtudinal direction of the traces, a photoelectric cell to emit a pulse when said spot of light crosses the trace; a counter electrically connected to the output of said photoelectric cell and of a character to pass therethrough only those pulses representative of the trace being scanned, and a sample and hold circuit whose output is a series of rectangular voltage levels formed by said sample and hold circuit sampling the sawtooth waveform at the instant it receives a pulse from said counter; the improvement which comprises: potentiometer means to generate a voltage level representative of the static correction to be applied to said trace being transcribed; second potentionmeter means of a character to generate a signal representative of the correction required for paper speed variations; third potentiometer means having an output signal representative of spread correction; adder means for adding the output signal from said first, second and third potentiometer means; and means to connect the output of said adder means to the vertical deflection plates of said cathode ray tube thus advancing or retarding the relative position of the scanning spot.

3. In an automatic transcribing system for transcribing one of several oscillographic traces to an electrical signal using a reference signal to drive a spot across a cathode ray tube traversely to the longitudinal direction of the traces, a light sensitive element to emit a pulse when said spot of light crosses a trace, a counter electrically connected to the output of the light sensitive element and of a character to pass therethrough only those pulses representative of the trace being scanned, and a sample and hold circuit whose output is a series of rectangular voltage levels formed by said sample and hold circuit sampling the reference signal at the instant it receives a pulse from said counter, the improvement which comprises: a manually adjustable potentiometer means, a rectangular wave generator means electrically connected to output of said potentiometer means, said wave generator being of a character to emit a rectangular pulse at each occurrence at a reference point of the reference signal and the width of each rectangular pulse being determined by the amplitude of the signal from said potentiometer means; a pulse shaper electrically connected to the output of said wave generator and of a character to emit a sharp pulse for each trailing edge of said rectangular wave pulse; switching means for disconnecting said counter from said sample and hold circuit and connecting said pulse shaper to said sample and hold circuit; and means electrically connecting the output of said pulse shaper with said cathode ray tube.

4. In an automatic transcribing system for transcribing one of several oscillographic traces to an electrical signal using a reference signal to drive a spot across a cathode ray tube traversely to the longitudinal direction of the traces, a light sensitive element to emit a pulse when said spot of light crosses a trace, a counter electrically connected to the output of the light sensitive element and of a character to pass therethrough only those pulses representative of the trace being scanned, and a sample and hold circuit means whose output is a series of rectangular voltage levels formed by said sample and hold circuit sampling the reference signal at the instant it receives the pulse from said counter, the improvement which comprises: first potentiometer means of a character to generate a voltage level representative of the static correction to be applied to the trace being transcribed; second potentiometer means of a character to generate a signal representative of the correction required for paper speed variations; third potentiometer means of a character to have an output signal representative of required spread corrections; adder means for adding the output signal from said first, second and third potentiometer means; means to connect the output of said adder means to the vertical deflection plates of said cathode ray tube thus advancing or retarding the relative position of a scanning spot; a manually adjustable potentiometer means, a rectangular wave generator means electrically connected to the output of said potentiometer means, said wave generator being of a character to emit a rectangular pulse at each occurrence of the reference point on the reference signal and the width of each rectangular pulse being determined by the amplitude of the signal from said manually adjustable potentiometer means; a pulse shaper electrically connected to the output of said wave generator and of a character to emit a sharp pulse for each trailing edge of said rectangular wave pulse; switching means for disconnecting said counter from said sample and hold circuit and capable of connecting said pulse shaper to said sample and hold circuit; and means electrically connecting the output of said pulse shaper with the vertical deflection plate of said cathode ray tube.

5. A method for transcribing an oscillographic seismic trace record into a reproducible trace record comprises sweeping a point of light traversely across said record with the sweeps being displaced progressively longitudinally along the record; detecting the time each sweep crosses the trace being transcribed by producing an electrical pulsation for each crossing; varying the position of the sweep of the spot of light relative to the rate of the recording of the reproducible trace to incorporate spread corrections along the reproducible trace; and further varying the advancement of said spot of light longitudinally along said oscillographic trace to incorporate paper speed corrections into the transcribed section.

6. In an automatic transcribing system for transcribing one of several oscillographic traces to an electrical signal having means to traversely drive a spot of light across the traces in a progressively displaced position, means to emit an electrical signal when said spot of light crosses a trace, means to separate the electrical pulses representative of the trace being translated, means to reconstruct from said pulses thus separated an electrical signal representative of the signal being translated, the improvement which comprises: means to generate a signal representative of the static correction to be applied; second means for generating an electrical signal representative of the required spread corrections for the trace being transcribed; and means for applying the output signals from said first and second means to vary the rate of progression of said spot with respect to said record.

References Cited in the file of this patent

UNITED STATES PATENTS

| | | |
|---|---|---|
| 2,628,689 | Rieber | Feb. 17, 1953 |
| 2,941,184 | Moody | June 14, 1960 |